Figure 1:
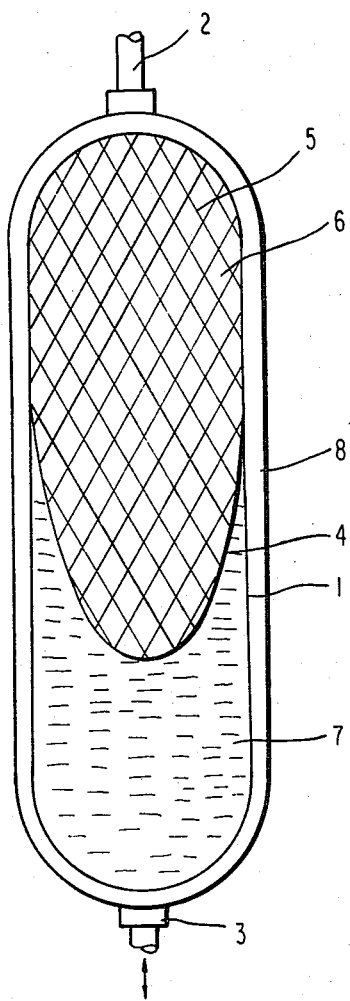

United States Patent [19]

Häfner et al.

[11] 4,367,786

[45] Jan. 11, 1983

[54] HYDROSTATIC BLADDER-TYPE STORAGE MEANS

[75] Inventors: Günther Häfner; Hans-Josef Haepp, both of Stuttgart, Fed. Rep. of Germany

[73] Assignee: Daimler-Benz Aktiengesellschaft, Stuttgart, Fed. Rep. of Germany

[21] Appl. No.: 209,417

[22] Filed: Nov. 24, 1980

[30] Foreign Application Priority Data

Nov. 23, 1979 [DE] Fed. Rep. of Germany ....... 2947258

[51] Int. Cl.$^3$ .......................... F28D 17/02; F28F 23/00
[52] U.S. Cl. .......................................... 165/10; 138/30; 165/41; 165/46; 165/104.11; 165/DIG. 4
[58] Field of Search ............... 165/DIG. 10, DIG. 41, 165/104.11 A, 10, 10 A, DIG. 8, 46, 41; 138/30

[56] References Cited

U.S. PATENT DOCUMENTS

| | | | |
|---|---|---|---|
| 2,852,033 | 9/1958 | Orser | 138/30 X |
| 2,904,077 | 9/1959 | Trumper | 138/30 |
| 3,665,967 | 5/1972 | Kachnik | 138/30 X |
| 4,181,155 | 1/1980 | Wesselink et al. | 138/30 |
| 4,211,208 | 7/1980 | Lindner | 165/46 X |
| 4,268,558 | 5/1981 | Boardman | 165/DIG. 10 |

FOREIGN PATENT DOCUMENTS

| | | | |
|---|---|---|---|
| 2552698 | 6/1977 | Fed. Rep. of Germany .... | 165/10 R |
| 2720188 | 11/1978 | Fed. Rep. of Germany .... | 165/10 R |

*Primary Examiner*—Sheldon J. Richter
*Attorney, Agent, or Firm*—Paul M. Craig, Jr.

[57] ABSTRACT

A hydrostatic bladder-type storage means for storing mechanical energy by a compressible media in a pressure bottle. An interior of the pressure bottle contains an elastically resilient bladder accommodating the medium. The pressurized medium is introduced into the bladder from one side of the bottle, with the bladder being surrounded by hydraulic oil which is adapted to be forced into and removed from a cavity located between the bottle and the bladder. A porous elastic body of foamed synthetic resinous material is provided in the bladder with the medium filling pores of the foam body. The foam body is intimately joined to the wall of the bladder and has a specific thermal capacity which is greater than the thermal capacity of the medium.

12 Claims, 2 Drawing Figures

HYDROSTATIC BLADDER-TYPE STORAGE MEANS

The present invention relates to a storage device and, more particularly, to a hydrostatic bladder-type storage means for storing mechanical energy by a compressible medium in a pressure bottle or tank having an interior which contains an elastically resilient bladder accommodating the compressible medium, with pressure medium being introduced into the bladder from one side of the bottle or tank and the bladder being surrounded by a hydraulic oil which is adapted to be forced into and removed from a cavity, disposed between the bottle and the bladder, from the other side of the pressure bottle or tank.

In order to compress gases for storing of mechanical energy in pressure bottles or tanks of the aforementioned type, it has been proposed to compress the gases. In such an arrangement, an elastically resilient bladder encompasses or accommodates the gas under pressure, which gas is introduced into the bladder from one side of the bottle or tank. During a charging of the storage means, hydraulic oil is customarily forced into the bottle or tank from the other side of the bottle so as to compress the bladder, with the bladder serving to separate the pressure gas from the pressure oil.

While charging of the pressure bottle, during a compression of the gas, the gas is heated in accordance with a polytropic phase change. The thus-formed heat is transferred, after a certain period of time, entirely to a wall of the container or bottle and from there to the outside since a total heat insulation between the gas and container is impossible. With a drop in temperature of the gas, likewise decreases. Consequently, from an energy viewpoint, a part of the charging work during charging of the storage means is converted into heat, which heat, due to the high temperature gradient, is transmitted to the surroundings within a short period of time and thus is lost for the energy storage means and the degree of efficiency of the bladder-type storage means is considerably reduced. Conversely, corresponding considerations apply regarding the discharging step by expansion of the working gas. The energy losses are higher with the higher temperature change of the wall during a charging and discharging procedure and the higher the temperature difference between the gas and the wall of the container or tank.

The aim underlying the present invention essentially resides in providing a hydrostatic bladder-type storage means which avoids losses arising during compression and expansion of the gas or at least reduces such losses to a minimum.

In order to avoid the aforementioned losses, it is necessary to avoid high temperature gradients between the gas and the wall of the container during a compression and expansion process. The avoidance of high temperature gradients is possible by being able to store a portion of the heat produced during compression and to re-transmit such heat to the medium during an expansion.

In accordance with advantageous features of the present invention, a porous elastic body of a foam synthetic resinous material with the medium filling the pores of the foamed body is provided in the bladder, which foamed body is intimately connected to the wall of the bladder. The foamed body has a specific heat capacity which is higher than the heat capacity of the medium. The foamed body must be of an open-pore foam or of a closed-pore foam in dependence upon the medium to be employed.

For example, if the gas utilized for carrying out the foaming process of the foamed body, e.g. nitrogen, is to be replaced by another gas, e.g., a carbon dioxide-hydrocarbon mixture, the foam must be open-pore; however, if the gas utilized for the foaming step is employed as the pressure medium, the foam may be a closed pore foam.

In order to obtain a maximally large contact area between the medium and the foamed body, advantageously in accordance with the present invention, the pores of the foamed body should have a diameter of about 1 mm. Due to the large surface area, a satisfactory heat exchange is ensured between the medium and the body of the foam material.

Advantageously, in accordance with further features of the present invention, the synthetic resinous material has a high specific heat if compared with the gas. Due to the specific heat of the foam material, which is high as compared with the gas, the temperature of the foam material remains practically unchanged during a phase change. Advantageously, a gas is employed which alters its physical condition as the temperature changes occuring at the pressure employed so that higher specific energy storage densitites may be attained.

In order to ensure that the change in physical conditions occurring during charging and discharging of the pressure bottle or tank approaches even more closely an isothermic phase change, it is possible in accordance with the present invention to introduce, into the elastically resilient mass of the foam body granules, a substance of, for example, paraffin, in finely distributed form, which substance experiences a phase transformation at a relatively low melting temperature of about 40°–70° C., that is, the substance melts during compression thus absorbing heat and resolidifies during an expansion thus emitting heat. Advantageously, the selected substance would absorb, during a compression of the storage gas, the heat of compression due to a phase change solid-liquid and thereby would practically prevent a temperature change of the material of the foam body proper.

Similar thermal processes occur if, in a modification of the above noted procedure, a granulated substance were to be introduced in finely divided form into the synthetic resinous material of the foam body wherein crystal transformation takes place at a relatively low crystal transformation temperature of about 40°–70° C., that is, a substance is provided which absorbs heat during compression due to a crystal transformation and assumes again the initial condition during expansion while transmitting heat.

In accordance with further advantageous features of the present invention, a medium such as, for example, carbon dioxide, hydrocarbons, and especially mixtures of carbon dioxide and hydrocarbons is utilized which changes its physical conditions at a temperature ambient during compression and passes over from the gaseous phase into a liquid phase, re-assuming the gaseous phase during expansion and executing this physical change in an approximately isobaric fashion.

For the above-noted type of heat transfer, it is also possible to employ a medium changing its physical condition at the temperatures and pressures prevailing during compression in such a manner that it passes over from the gaseous phase directly into the solid phase (sublimation), and changes over during expansion from the solid phase to the gaseous phase and executes these changes in condition in an approximately isobaric manner.

However, it is also possible to impart to the synthetic resinous material, which material is introduced in the fluid or pourable condition into the empty bladder and forms the porous body therein after a blowing, such a composition that a gas or gaseous mixture produced during a blowing or foaming exhibits a specific thermal capacity which is low as compared with the foam body.

However, it is also possible in accordance with the present invention, to utilize a synthetic resinous material for the above-noted purpose which has a composition such that the gas or gaseous mixture produced during a blowing or foaming changes its physical condition at the temperatures ambient during compression and passes over from the gaseous condition into the liquid condition, re-assuming the gaseous phase during expansion and executing these phase changes approximately isobarically. However, the medium may also be sublime, that is, the medium may pass over, at temperatures ambient during compression, from the gaseous phase directly into the solid phase and execute, during expansion, the reverse phase changes.

It is also possible in accordance with the present invention, to utilize a synthetic resinous material wherein a gas, for example, nitrogen, is formed during foaming which is not as well suitable for the intended heat transfer but which is replaced, after a blowing step, by a medium, for example, a carbon dioxide-hydrocarbon mixture, having a specific thermal capacity which is less as compared to that of the foam body. This replacement medium with specific thermal capacities which are low as compared with the foam body may change its physical conditon at the temperature differences ambient during compression either in such a way that it passes over from the gaseous phase into the liquid phase and back again where the medium sublimes, that is, passes over from the gaseous phase directly into the solid phase and back again into the gaseous phase.

In order to perform the entire heat transfer procedure at a maximum efficiency independently of external influences, in accordance with the present invention, additional provision may be made to surround the pressure bottle or tank by insulating layer. However, the pressure bottle may also be surrounded by a hollow space in order to maintain a desired temperature level, with the hollow space being traversed by a flowing medium of approximately uniform temperature and connected, for example, to a cooling water circulatory system of a motor vehicle.

In addition to other purposes, the hydrostatic bladder-type storage means of the present invention may be advantageously utilized for an intermediate energy storage device in a hybrid drive mechanism for motor vehicles. More particularly, in this field of use, high storage capacities with a high degree of storage efficiency are required. Moreover, considerations of the principle involved reveal that another interesting aspect for the bladder-type storage means and storage technique of the present invention in connection with the regenerative drive system also applies to small system sizes such as, for example, passenger motor vehicles, for energy saving purposes. By using a condensing media, the storage density of the storage means may be increased and the large internal surface area of the heat storing foam body may bring storage losses to a minimum under high alternating loads.

As can readily be appreciated the selection of a suitable gas and/or gas mixture is dependent upon the pressure at which the storage means is operated. The selection can be readily made by considering the physical characteristics of the gases. However, care must be taken to ensure that the selected gas or gas mixture displays inert behavior with respect to the foam so as not to destroy the foam body. Thus, suitable gases may, for example, be nitrogen, noble gases, and other gases inert to the foam.

Accordingly, it is an object of the present invention to provide a hydrostatic bladder-type storage means which avoids, by simple means, shortcomings and disadvantages encountered in the prior art.

Another object of the present invention resides in providing a hydrostatic bladder-type storage means which minimizes if not avoids any losses which arise during compression and expansion of a gas of the storage means.

Yet another object of the present invention resides in providing a hydrostatic bladder-type storage means which is capable of storing a portion of the heat produced during a compression and capable of re-transmitting the heat to a medium of the storage means during an expansion.

A further object of the present invention resides in providing a hydrostatic bladder-type storage means which is adapted to be utilized for drive systems of passenger motor vehicles.

A still further object of the present invention resides in providing a hydrostatic bladder-type storage means which is simple in construction and therefore relatively inexpensive to manufacture.

Another object of the present invention resides in providing a hydrostatic bladder-type storage means which minimizes if not avoids the occurrence of high temperature gradients between a gas of the storage means and wall of a container during compression and expansion processes.

Figure 2:
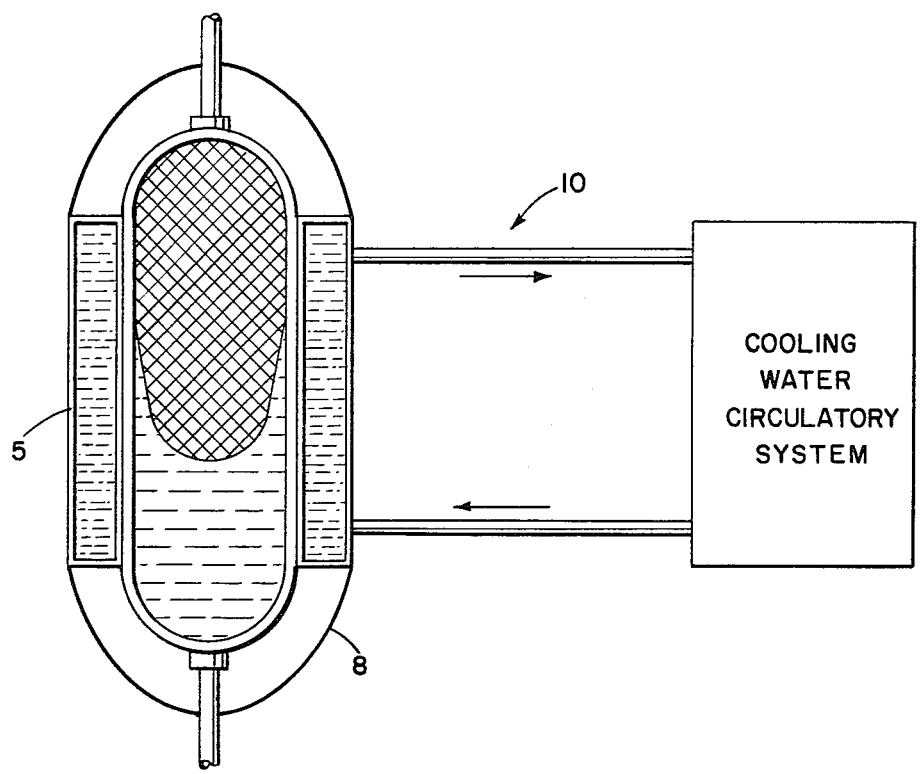

These and other objects, features, and advantages of the present invention will become more apparent from the following description when taken in connection with the accompanying drawing which shows, for the purposes of illustration only, several embodiments in accordance with the present invention, and wherein:

FIG. 1 is a partially schematic cross sectional view of a hydrostatic bladder-type storage means in accordance with the present invention; and FIG. 2 is a partially schematic cross sectional view of another embodiment of a hydrostatic bladder-type storage means constructed in accordance with the present invention.

Referring now to FIG. 1 of the drawing, according to this figure, a hydrostatic bladder-type storage means includes a steel pressure bottle or tank 1 provided on one side thereof with a gas feed nipple or connecting pipe 2 and, on the other side thereof, with an oil inlet and discharge nipple 3. An elastically resilient bladder 4 is disposed in an interior of the steel pressure bottle 1, with the interior being connected or communicated with the gas feed nipple 2.

In accordance with the present invention, the bladder 4 is filled with a synthetic resinous material which is blown, foamed, or expanded within the bladder 4 and, after polymerization, fills the entire bladder 4 with a foam body 5 intimately joined to the bladder wall and exhibiting a pore size of about 1 mm. The synthetic resinous material may, for example be polyurethane foam or plasticized polyvinyl foam, and has a high specific heat as compared to a medium 6 produced during the foaming step or introduced after the foaming in lieu of the foaming medium.

The foaming in the bladder 4 may take place either by a reaction of the material to be foamed, for example, by a splitting off of carbon dioxide during the formation of a polyurethane foam, wherein the polyurethane thus becomes a foam; or blowing or foaming agent may be added to the plastic mass to be converted into foam. Any suitable number of known blowing agents may be employed to provide a foamed synthetic resinous material. The blowing agents are compounds which are capable of splitting off gases under an effect of heat or catalysis to enable the carrying out of the foaming process. The gases may, for example, be nitrogen or carbon dioxide.

Pressurized hydraulic oil 7 is supplied through the nipple 3 provided at the other side of the steel body 1. The hydraulic oil 7 is withdrawn at an appropriate point in time and may be used for driving corresponding units.

In order to ensure that a thermal process in an interior of the steel bottle 1 during compression and expansion is undisturbed by external conditions, advantageously, the bottle may be surrounded by a layer 8 of insulating material; however, as shown most clearly in FIG. 2, the insulating layer 8 may also be constructed such that the bottle 1 is surrounded by a hollow cavity or space S adapted to be traversed by a flowing cooling medium having a uniform temperature. The flowing cooling medium may, for example, be the coolant of a motor vehicle and, for this purpose, a special connection (not shown) is provided for connecting the bottle 1 and, in particular, the hollow cavity or space S, with a conventional cooling water circulatory system (generally designated by the reference numeral 10) of a motor vehicle.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

We claim:

1. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means and the bladder means, characterized in that a porous elastic body of a foam synthetic resinous material is disposed in the bladder means and intimately joined thereto, the compressible medium fills the pores in the porous elastic body, the material in the porous elastic body has a specific thermal capacity which is higher than a thermal capacity of the compressible medium, a granular substance is finely distributed in the synthetic resinous material of the porous elastic body, and in that the granular substance is adapted to incur a phase transformation at a relatively low melting temperature of about 40°–70° C. such that the substance melts during a compression of the bladder means to absorb heat and resolidifies during an expansion of the bladder means to emit heat.

2. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means located between an interior wall of the pressure bottle means and the bladder means, characterized in that a porous elastic body of a foam synthetic resinous material is disposed in the bladder means and intimately joined thereot, the compressible medium fills the pores in the porous elastic body, the material in the porous elastic body has a specific thermal capacity which is higher than a thermal capacity of the compressible medium, a granulated substance is finely distributed in the synthetic resinous material of the porous elastic body, the substance is adapted to incur a crystalline transformation at a relatively low crystal transformation temperature of about 40°–70° C. such that due to the crystal transformation, the substance absorbs heat during compression of the bladder means and reassumes the initial condition during an expansion of the bladder means so as to emit heat.

3. A hydrostatic bladder-type storage means according to claim 2, characterized in that the compressible medium is adapted to change physical condition at a temperature ambient during compression of the bladder means so as to pass from a gaseous phase into a liquid phase during a compression of the bladder means and reassume the gaseous phase during an expansion of the bladder means, with changes in the physical condition of the compressible medium being executed in an approximately isobaric manner.

4. A hydrostatic bladder-type storage means according to claim 2, characterized in that the compressible medium is adapted to change physical conditions at temperatures ambient during a compression of the bladder means and pass over from a gaseous phase into a solid phase and, during an expansion of the bladder means, to pass over from a solid phase into the gaseous phase, with the changes in physical conditions executed in an approximately isobaric manner.

5. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means and the bladder means, characterized in that a porous elastic body of a foam synthetic resinous material is disposed in the bladder means and intimately joined thereto, the compressible medium fills the pores in the porous elastic body, the material in the porous elastic body has a specific thermal capacity which is higher than a thermal capacity of the compressible medium, the synthetic resinous material is filled into the bladder means in a flowable or pourable condition and subsequently foamed so as to form the porous elastic body, and in that a gas or gaseous mixture produced during a foaming of the synthetic resinous material is adapted to change physical characteristics at temperatures ambient during a compression of the bladder means so as to pass from a gaseous phase to a liquid phase, and, during an expansion of the bladder means, to reassume the gaseous phase, with changes in the physical conditions being executed in an approximately isobaric manner.

6. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means and the bladder means, characterized in that a porous elastic body of a foam synthetic resinous material is disposed in the bladder means and intimately joined thereto, the compressible medium fills the pores in the porous elastic body, the material in the porous elastic body has a specific thermal capacity which is higher than a thermal capacity of the compressible medium, the synthetic resinous material is filled into the bladder means in a flowable or pourable condition and subsequently foamed so as to form porous elastic body and in that a gas or gas mixture produced during a foaming of the synthetic resinous material is adapted to change physical condition at temperatures ambient during a compression of the bladder means so as to pass from a gaseous phase into a solid phase and, during an expansion of the bladder means, to pass over again from the solid phase into the gaseous phase, with the changes in physical condition being executed in an approximately isobaric manner.

7. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means and the bladder means, characterized in that a porous elastic body of a foam synthetic resinous material is disposed in the bladder means and intimately joined thereto, the compressible medium fills the pores in the porous elastic body, the material in the porous elastic body has a specific thermal capacity which is higher than a thermal capacity of the compressible medium, the synthetic resinous material is filled into the bladder means in a flowable or pourable condition and subsequently foamed so as to form the porous elastic body, and in that a gas produced during a foaming of the synthetic resinous material is replaced by a medium which is adapted to change physical conditions at temperatures ambient during a compression of the bladder means so as to pass over from a gaseous phase into a liquid phase and, during an expansion of the bladder means, to reassume the gaseous phase, with the changes in physical conditions being executed in an approximately isobaric manner.

8. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means and the bladder means, characterized in that a porous elastic body of a foam synthetic resinous material is disposed in the bladder means and intimately joined thereto, the compressible medium fills the pores in the porous elastic body, the material in the porous elastic body has a specific thermal capacity which is higher than a thermal capacity of the compressible medium, the synthetic resinous material is filled into the bladder means in a flowable or pourable condition and subsequently foams so as to form the porous elastic body, and in that a gas produced during a foaming of the synthetic resinous material is replaced by a medium adapted to change physical conditions at temperatures ambient during a compression of the bladder means so as to pass over from a gaseous phase into a solid phase and, during an expansion of the bladder means to pass over again from a solid phase to the gaseous phase, with changes in physical condition being executed in an approximately isobaric manner.

9. A hydrostatic bladder-type storage means for storing mechanical energy, the storage means comprising a pressure bottle means, an elastically resilient bladder means disposed in an interior of the pressure bottle means for accommodating a compressible medium, means provided on a first side of the pressure bottle means for enabling an introduction of the compressible medium into the bladder means, and means provided on a second end of the pressure bottle means for enabling a hydraulic fluid to be forced into and removed from the space in the pressure bottle means located between an interior wall of the pressure bottle means and the bladder means, characterized in that a porous elastic body of a foam synthetic resinous material is disposed in the bladder means and intimately joined thereto, the compressible medium fills the pores in the porous elastic body, the material in the porous elastic body has a specific thermal capacity which is higher than a thermal capacity of the compressible medium, and in that means are provided for maintaining the pressure bottle means at a predetermined temperature level.

10. A hydrostatic bladder-type storage means according to claim 9, characterized in that said maintaining means includes a cavity surrounding the pressure bottle means, the cavity adapted to be traversed by a flowing medium of a uniform temperature.

11. A hydrostatic bladder-type storage means according to claim 10, disposed in a motor vehicle, characterized in that means are provided for connecting the cavity with a cooling water circulatory system of the motor vehicle.

12. A hydrostatic bladder-type storage means according to one of claims 1, 2, 5, 6, 7, 8 or 9, characterized in that the synthetic resinous material after a polymerization forms a foam body having a pore size of about 1 mm in diameter.

* * * * *